Dec. 16, 1947.  R. H. TULL ET AL  2,432,547
TEMPERATURE AND LIQUID LEVEL CONTROL FOR REFRIGERATION APPARATUS
Filed Feb. 6, 1945
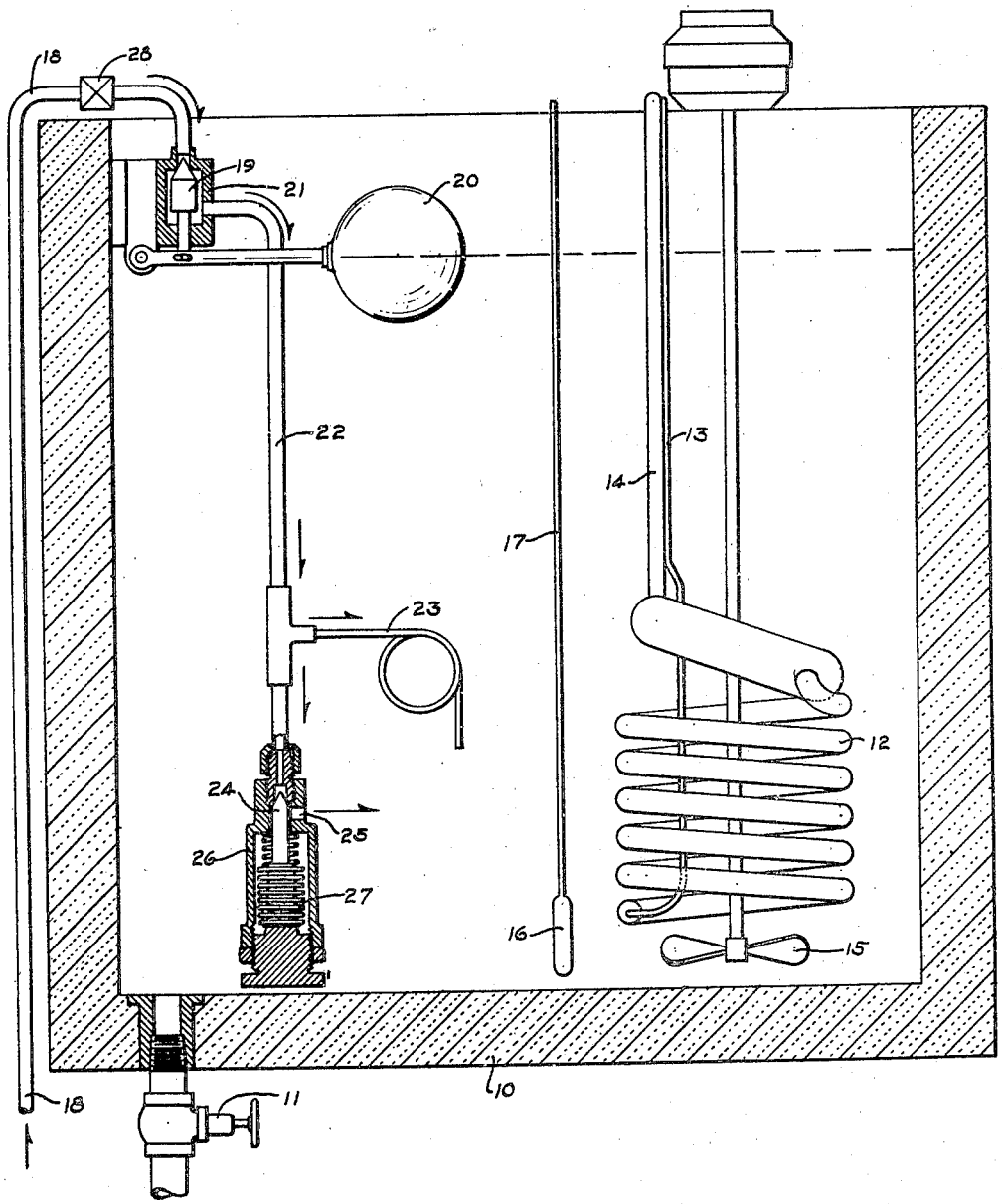
WITNESSES:
INVENTOR
ROBERT H. TULL,
EVERT S. WEGMAN
BY
ATTORNEY Patented Dec. 16, 1947

2,432,547

UNITED STATES PATENT OFFICE 2,432,547

TEMPERATURE AND LIQUID LEVEL CONTROL FOR REFRIGERATION APPARATUS

Robert H. Tull, Springfield, and Evert S. Wegman, East Longmeadow, Mass., assignors to Westinghouse Electric Corporation, East Pittsburgh, Pa., a corporation of Pennsylvania Application February 6, 1945, Serial No. 576,484

3 Claims. (Cl. 62—7)

1

This invention relates to refrigerating apparatus and more particularly to such apparatus as used for cooling liquids to predetermined temperatures.

In liquid cooling apparatus, as used for example, in the cooling and storing of drinking water, which water is to be dispensed at a constant temperature, the irregular demands upon the system, together with the fact that the system is expected to produce a satisfactory beverage whether the temperature of the incoming water be 60° F. or 100° F., and whether the temperature of the room in which the cooler is placed be between the same limits or even higher, have made necessary a compromise in the refrigerating capacity of the cooling unit between that which is adequate to cool and maintain the body of cooled water at the desired dispensing temperature during "peak" conditions, when the demand for water is almost constant and the room and incoming water temperatures are high, and that when the demand and the room and incoming water temperatures are more nearly normal.

This problem is accentuated in that type of water cooling system where the incoming water is admitted to the cooling and storage tank from a source under pressure, such as the ordinary city water line, through a float or other level controlled valve, for in such a case the level in the storage tank falls rapidly at times of peak draw with the result that the incoming water enters in such volume that it is insufficiently cooled before it is used for beverage purposes unless the cooling unit be inordinately large in relation to the normal operation of the apparatus.

Our invention, therefore, has as an object the provision of a system wherein the cooling unit is designed to take care of the system under normal conditions of operation but in which the amount of incoming water never exceeds the capacity of the cooling unit to reduce it to the selected dispensing temperature.

The invention further contemplates the provision of temperature-responsive means associated with level control means for controlling the ingress of make-up water to the storage tank in accordance with the capacity of the refrigerating unit.

A further object of the invention is to assure the flow of a predetermined volume of water into the tank in response to a lowered level independently of the temperature-responsive flow-controlling means.

These and other objects are effected by our

2 invention as will be apparent from the following description and claims taken in connection with the accompanying drawings, forming a part of this application, in which the single figure of the drawing is a partially diagrammatic view in vertical section of a liquid cooling apparatus embodying our invention.

The insulated tank 10 for containing the liquid to be dispensed is provided with an outlet valve 11 through which the cooled liquid is withdrawn. The liquid can be any liquid which it is desired be withdrawn from the storage tank at a predetermined temperature, and for simplicity of description will be hereafter referred to as drinking water or simply water.

The water in the tank 10 is cooled by a refrigerant cooling unit, here shown as a coil 12, to which liquid refrigerant is fed by a small conduit 13, and from which expanded refrigerant is withdrawn through a suction conduit 14. Conduits 13 and 14 are, of course, connected to a suitable refrigerant condensing unit (not shown). Preferably the cooling unit is placed near the bottom of the storage tank and it is also preferable to provide a motor-driven agitator 15 for circulating the water in the tank to assist in maintaining a uniform temperature. The refrigerating unit is stopped and started in response to the temperature of the stored water, a thermostatic bulb for that purpose being indicated at 16 and connected by a tube 17 to a suitable temperature-responsive switch (not shown). For drinking water purposes, the switch may be set to open when the water temperature falls to 34° F. and to close when the temperature rises to 40° F.

Water is supplied to the tank 10 from a suitable source under pressure through a conduit 18. The passage of water from this conduit to the tank is controlled by a valve 19 actuated by a float 20. Valve 19 is shown in the drawing in its closed position. After passing this valve water enters the valve body 21 and then flows into conduit 22. From conduit 22 the water flows in two parallel paths, one through a restricted by-pass 23 to the tank, and the other past a valve 24 through orifice 25 to the tank. The valve 24 and orifice 25 are disposed in a casing 26 which is located adjacent the bottom of the tank. Also disposed in the casing 26 is a temperature-responsive member, here shown as spring-biased bellows 27, for seating and unseating valve 24. The particular temperature-responsive device used should be selected in accordance with the operating characteristics required in the system. In the example herein described, we selected a device which completely closed valve 24 to shut off the flow of water when the temperature of the surrounding bath exceeded 40° F. and which opened gradually as the temperature reached or fell below that point until at 34° F. it was fully open. The valve 24 is sometimes referred to herein as a "modulating valve."

Preferably, a pressure-regulating valve 28 is provided in the intake conduit 18 so that the water enters the tank under a constant pressure.

In the operation of the system, let it be first assumed that the tank is completely empty, but that the water connections have been made and the refrigerating unit is operating. The float 20 will have dropped to open valve 19 but valve 24 will be closed because the temperature of bellows 27 is above 40° F. Water from conduit 18 can then flow into the tank 10 only through the constantly open restricted by-pass 23, which is here shown as a flow-restricting tube of considerable length and small diameter. When the entering water is cool enough to affect the bellows 27, the valve 24 unseats and an increased amount of water enters the tank, the amount being regulated by the temperature of the water in the tank and the position of float 20.

The by-pass 23 should be so designed as to admit only that volume of water which the refrigerating unit can handle under peak conditions of water and room temperature. For example, if the water head pressure be approximately ten pounds gauge, we have found that a by-pass permitting a flow of five gallons per hour can be made from approximately nine feet of "capillary" tubing of 0.066 inch inside diameter. This rate of flow was selected for a tank cooled by a refrigerating unit having a maximum capacity of 2760 B. t. u. per hour in 110° ambient.

We have shown the modulating valve and its operating mechanism together with the by-pass entirely inside the tank 10. However, it is also possible to place the modulating valve outside the tank and ahead of the float valve 19, with the temperature-responsive device inside the tank and connected by a tube with the modulating valve, and with the by-pass connected in parallel with the modulating valve ahead of the float valve. The main point is that the modulating valve and the float valve are in series.

While we have shown our invention in but one form, it will be obvious to those skilled in the art that it is not so limited, but is susceptible of various changes and modifications without departing from the spirit thereof.

What we claim is:

1. In apparatus of the type wherein liquid is stored in a tank and is cooled therein by a refrigerating unit, and from which tank the cooled liquid is periodically withdrawn, and in which the liquid is supplied to the tank from a source under pressure and in which flow of liquid into the tank is controlled by means responsive to the liquid level in the tank, the combination with said liquid level control means, of means in series therewith and responsive to the temperature of liquid within the tank for also controlling admission of liquid to the tank, and means in parallel with the temperature-responsive means for by-passing a predetermined volume of liquid to the tank regardless of the temperature-responsive means.

2. In apparatus of the type wherein liquid is stored in a tank and is cooled therein by a refrigerating unit, and from which tank the cooled liquid is periodically withdrawn, and in which the liquid is supplied to the tank from a source under pressure and in which flow of liquid into the tank is controlled by means responsive to the liquid level in the tank, the combination with said liquid level control means, of means in series therewith and responsive to the temperature of liquid within the tank for also controlling admission of liquid to the tank, and means in parallel with the temperature-responsive means for by-passing a predetermined volume of liquid to the tank regardless of the temperature-responsive means, said by-pass means comprising a constantly-open flow-restricting device having predetermined flow control characteristics.

3. In apparatus of the type wherein liquid is stored in a tank and is cooled therein by a refrigerating unit, and from which tank the cooled liquid is periodically withdrawn, and in which the liquid is supplied to the tank from a source under pressure and in which flow of liquid into the tank is controlled by means responsive to the liquid level in the tank, the combination with said liquid level control means, of means in series therewith and responsive to the temperature of liquid within the tank for also controlling admission of liquid to the tank, and means in parallel with the temperature-responsive means for by-passing a predetermined volume of liquid to the tank regardless of the temperature-responsive means, said by-pass means comprising a constantly-open tube of small inside diameter and relatively great length with respect to its diameter.

ROBERT H. TULL.
EVERT S. WEGMAN.

REFERENCES CITED

The following references are of record in the file of this patent:

UNITED STATES PATENTS

| Number | Name | Date |
|---|---|---|
| 2,346,259 | Hutchings | Apr. 11, 1944 |
| 1,897,559 | Kellogg | Feb. 14, 1933 |